UNITED STATES PATENT OFFICE.

WILLIAM R. WALKER, OF NEW YORK, N. Y.

TREATING STEEL IN ELECTRIC FURNACES WITH BASIC HEARTHS.

1,086,489. Specification of Letters Patent. Patented Feb. 10, 1914.

No Drawing. Application filed December 14, 1912. Serial No. 736,719.

*To all whom it may concern:*

Be it known that I, WILLIAM R. WALKER, a citizen of the United States, residing in the city, county, and State of New York, have invented new and useful Improvements in Treating Steel in Electric Furnaces with Basic Hearths, of which the following is a specification.

In the making or refining of steel in electric furnaces, the usual method has been to make the lining or hearth of the furnace of basic material, such as burnt magnesite or dolomite, the roof being of silica brick. The slag used has been highly basic, containing—say about 15 per cent. of silica, and requiring a considerable addition—say 30 per cent., of fluor spar to act as a flux. Electric furnaces with acid or silicious hearths have been proposed, but up to this time have not been put to any extensive practical use. In these acid electric furnace operations, the slag used has had a high silica content (52.75, 65.16 and 60.46 per cent. in specific typical cases, as compared with a silica content of 15.95 per cent. in a specific basic slag for electric furnaces). In the acid electric process, it is necessary to use ore to oxidize the large excess of silicon reduced into the bath from the silicious lining of the furnace and the highly silicious slag as used in this process, a variable amount of oxid of iron being present in this silicious slag and in the metal at the time of pouring the steel into the ladle. The temperature attainable in the electric furnace is sufficiently high to melt a slag of extreme basicity, and the fumes from the highly basic slags generally used have a strong corrosive action on the silica of the roof, so that the latter requires renewing at frequent intervals, resulting in considerable expense and very serious delays in the operation of the electric furnace. The fluor spar which becomes volatilized has the same corrosive effect on the roof, and this material furthermore is quite expensive. The chief reason for using a slag so highly basic, has been to reduce to a minimum the sulfur content of the product. I have found, however, that by using a slag containing a comparatively high percentage of silica, the sulfur content of the metal may be reduced to practically the same extent as before and considerable economies are effected in the operating of the furnace and also an improvement secured in the quality of the steel produced. In these previous basic processes, the percentage of silica has been so low that if any of it was reduced to silicon, such reduction was only temporary, the oxids present being sufficient to reconvert it into silica, so that it remained in or returned to the slag and there was no appreciable increase of silicon in the product traceable to the silica in the slag. I propose to increase the quantity of silica in the slag to such an extent that a part thereof will be reduced and remain in the metal, at the same time keeping the percentage of silica so low that it will not cut the hearth to any substantial extent.

The operation is a reducing one at all times. The silicon enters the bath while wholly, or largely, in the nascent condition and, therefore, in a condition most active in eliminating oxids and other deleterious substances which may be in the bath. There is no addition of ore (as in the acid process) to remove surplus silicon and I must, therefore, avoid introducing a surplus of silica and must keep within the limit at which the slag would seriously scorify the hearth. I cannot, therefore, always secure all the silicon that I desire in the product, from the silica introduced into the slag, but I can secure a substantial percentage of silicon in the product in this way, thus effecting a considerable economy. The actual percentage of silica in the slag will vary considerably for different materials and circumstances, but will generally be between 25 and 35 per cent. of the total weight of the slag. The percentages cannot be stated with absolute accuracy; and the slag besides comprising lime and silica may also contain other elements, such for example as alumina. Due consideration must be given to the fact that the commercial lime and silica are not pure and that other impurities will be introduced to a greater or less extent from the metal itself and from the hearth. The mixture of lime and silica should be approximately neutral (that is neither strongly basic nor strongly acid); then as silica is reduced to silicon there is present in the slag a percentage of lime sufficient for desulfurizing. A good practical example is a slag made of silica 30 per cent. and lime (approximately pure CaO) 70%, to which should be added coke (or other carbonaceous material) at least 5 per cent. by weight of the combined silica and lime. This slag will also contain magnesia and alumina, which are derived from the furnace bottom materials and the lime additions.

Besides the advantages above referred to, the invention has certain other important advantages. In the first place, the slag with the increased percentage of silica is more fusible. Furthermore, the quantity of fluor spar necessary may be reduced to little or none, thus saving a considerable expense. Also, by suitably proportioning the silica to the lime, I can minimize the formation of fumes in the furnace so that when the ingredients of the slag are in the best proportions, one can look into the furnace without seeing any of the fumes which generally fill the space above the metal. Working with the 30 per cent. silica slag above described, I have found that the roof of the furnace will last much longer than with the previously used basic slags under similar conditions. Where the sides of the furnace are of silica brick, as is sometimes the case, approximately the same increased life is obtained as for the silica roof.

The method may be used for refining or working metal brought molten to the electric furnace or it may be used in processes in which the metal is put into the electric furnace cold and melted down therein, or on refined or partially refined metal coming from a basic Bessemer converter or basic open hearth furnace, or the refined or partially refined metal from the acid converter or acid open hearth furnace; in the two latter cases, first using an oxidizing slag of ordinary composition for the removal of the remaining carbon, silicon and phosphorus and then following with the finishing slag described in the present invention. This refining slag is melted preferably by electric heat and can be more easily melted than the slags that have been previously used. The previous slag has required about thirty minutes for melting and the new slag requires only about fifteen minutes. This saving of time means a very substantial economy in the cost of the steel produced. The slag is a finishing slag and, by reason of its great liquidity and the consequent freedom with which it circulates, has a more thorough purifying effect on the metal. The slag being more liquid, small particles which are inclosed in the metal rise to the surface more readily, thus leaving the bath in an extremely pure metallic condition. The more liquid slag flows more readily from the furnace after the metal has been removed.

The invention is designed especially for use in connection with electric arc furnaces, of the Heroult arc type for example, because in these furnaces it is easy to secure the high temperature desired and to observe and regulate the working of the process.

The process is of particular advantage in the manufacture of soft or low carbon steel. The greater or less quantity of nascent silicon which enters the bath serves to purify it and in a way to make up in purifying effect for the lack of carbon in the bath. The silica in the slag may be so proportioned that the quantity of nascent silicon which enters the bath shall be only sufficient to have a purifying effect and shall not be sufficient to leave any appreciable percentage of silicon in the finished product.

Collectively, the several advantages above specified mean a very important economy in the production of electrically refined steel. The invention also enables me to produce a steel that will be more uniformly free from slag inclosures and also more thoroughly deoxidized and free from deleterious substances, than is possible with previous processes. The deoxidation and freedom from such deleterious substances is the most important element in the production of steel of the highest quality. By this process it is possible to produce steel of a quality similar to that produced in the so called crucible process at a cost that will not be prohibitive even for heavy products, such for example as rails, axles, ties, etc., and also for soft steel, such as boiler plate and bridge and structural shapes.

What I claim is:

1. The method of treating iron or steel which consists in applying thereto a slag comprising lime and silica and maintaining the metal and slag molten on a basic hearth in an electric furnace, the quantity of silica being about 25 to 35 per cent. of the total weight of the slag.

2. The method of treating iron or steel which consists in applying thereto a slag comprising lime and silica and maintaining the metal and slag molten on a basic hearth in an electric furnace, the lime and silica being approximately in such proportions as to form a neutral mixture, that is, a mixture which is neither strongly acid nor strongly basic.

3. The method of treating iron or steel which consists in applying thereto a slag comprising lime and silica and maintaining the metal and slag molten on a basic hearth in an electric furnace, the percentage of silica in the slag being so low as to avoid serious scorifying of the hearth and being so high that silicon is reduced therefrom and is incorporated in the product.

4. The method of treating iron or steel which consists in applying thereto a slag comprising lime and silica and maintaining the metal and slag molten on a basic hearth in an electric furnace, the silica and lime being in such proportions as to provide for a reduction of silicon and an incorporation thereof in the product and to provide sufficient lime to practically eliminate sulfur from the product.

5. The method of treating iron or steel which consists in applying thereto a slag comprising lime and silica and maintaining the metal and slag molten on a basic hearth in an electric furnace, the percentage of silica in the slag being sufficient to practically avoid formation of fumes of lime in the furnace.

6. The method of treating iron or steel which consists in applying thereto a slag comprising lime and silica and maintaining the metal and slag molten on a basic hearth in an electric furnace, the slag comprising about 30 per cent. silica and 70 per cent. lime, to which are added about 5 per cent. by weight of carbonaceous material.

7. The method of treating iron or steel which consists in melting the same on a basic hearth in an electric furnace with an oxidizing slag and thus taking out carbon, silicon and phosphorus, removing said slag and applying to the bath a finishing slag comprising lime and silica in approximately such proportions as to form a neutral mixture, that is a mixture which is neither strongly acid nor strongly basic, and finishing the metal with such slag.

8. In the making of soft or low carbon steel the method which consists in applying to the bath a slag comprising lime and silica and maintaining the metal and slag molten on a basic hearth in an electric furnace, the percentage of silica in the slag being so high that silicon is reduced therefrom and enters the bath in nascent condition.

9. In the making of soft or low carbon steel the method which consists in applying to the bath a slag comprising lime and silica and maintaining the metal and slag molten on a basic hearth in an electric furnace, the percentage of silica in the slag being so high that silicon is reduced therefrom and enters the bath in nascent condition in sufficient quantity to remove impurities to a substantial extent but not in sufficient quantity to appear in an appreciable percentage in the finished product.

In witness whereof, I have hereunto signed my name in the presence of two subscribing witnesses.

WILLIAM R. WALKER.

Witnesses:
D. ANTHONY USINA,
LULU STUBENBOLL.